(12) United States Patent
Malafaia

(10) Patent No.: US 12,714,211 B2
(45) Date of Patent: Aug. 25, 2026

(54) PROTECTIVE CASE WITH REMOVABLE FUNCTIONAL MODULES

(71) Applicant: Mozart Malafaia, Lake Mary, FL (US)

(72) Inventor: Mozart Malafaia, Lake Mary, FL (US)

( * ) Notice: Subject to any disclaimer, the term of this patent is extended or adjusted under 35 U.S.C. 154(b) by 204 days.

(21) Appl. No.: 18/507,698

(22) Filed: Nov. 13, 2023

(65) Prior Publication Data

US 2024/0180306 A1 Jun. 6, 2024

Related U.S. Application Data

(60) Provisional application No. 63/597,877, filed on Nov. 10, 2023, provisional application No. 63/429,872, filed on Dec. 2, 2022.

(51) Int. Cl.

| | |
|---|---|
| ***H04W 8/18*** | (2009.01) |
| ***A45C 11/00*** | (2006.01) |
| ***H04B 1/3888*** | (2015.01) |

(52) U.S. Cl.

CPC ............ *A45C 11/00* (2013.01); *H04B 1/3888* (2013.01); *A45C 11/002* (2025.01); *A45C 11/003* (2025.01)

(58) Field of Classification Search

CPC ..... A45C 11/00; A45C 11/002; A45C 11/003; A45C 15/00; H04B 1/3888

USPC .......................................................... 455/418

See application file for complete search history.

(56) References Cited

U.S. PATENT DOCUMENTS

| | | | | |
|---|---|---|---|---|
| 9,857,837 | B1 | 1/2018 | VanKirk | |
| 2015/0194833 | A1* | 7/2015 | Fathollahi | G06F 1/188 320/114 |
| 2016/0043764 | A1 | 2/2016 | Huang | |
| 2016/0308569 | A1 | 10/2016 | Wei | |
| 2019/0326943 | A1 | 10/2019 | Nguyen et al. | |

* cited by examiner

*Primary Examiner* — Tanmay K Shah

(74) *Attorney, Agent, or Firm* — Jason T. Daniel, Esq.; Daniel Law Offices, P.A.

(57) ABSTRACT

A protective case with removable functional modules includes a front housing for engaging the front surface of a portable electronic device, and a main body having a front surface for receiving the portable electronic device and the front housing to form a protective shell for the portable electronic device. A plurality of metallic strips, a communication panel and a system controller are positioned along the main body. A removable module is secured onto the main body. The module having a plurality of magnetic elements for engaging the metallic strips, a plurality of alignment tabs for engaging the alignment holes, and a plurality of communication terminals for engaging the communication panel. The module includes a functional component comprising a battery pack for providing power to each of the portable electronic device and the system controller.

13 Claims, 10 Drawing Sheets

PROTECTIVE CASE WITH REMOVABLE FUNCTIONAL MODULES

CROSS-REFERENCE TO RELATED APPLICATIONS

This application claims the benefit of U.S. Application Ser. No. 63/429,872 filed on Dec. 2, 2022, and U.S. Application Ser. No. 63/597,877 filed on Nov. 10, 2023, the contents of which are incorporated herein by reference.

TECHNICAL FIELD

The present invention relates generally to electronic accessories, and more particularly to a protective case for a phone or tablet having a plurality of removable modules for performing specified functions.

BACKGROUND

The statements in this section merely provide background information related to the present disclosure and may not constitute prior art.

The history of protective cases for portable electronic devices dates back to the early days of cell phones. Because early cell phones were bulky and expensive, cases were mostly constructed from leather or hard plastic, and were designed to protect the phones from scratches and dents. Beginning in the early 2000s, silicone cases became popular, as they were more flexible and shock-absorbent than their hard plastic counterparts. Additionally, silicone cases were less expensive to manufacture, and were able to incorporate many different types of colors and design elements such as various imprints, pictures, and the like.

As such, users began to purchase cases for the way they looked, as much as for the protection they provided. Today, smartphone and tablet cases are more popular than ever before, as literally thousands of manufacturers provide cases in a wide variety of materials, styles, and designs. However, the basic functionality of these protective cases has not changed since their inception. Cases protect the electronic device and do nothing else.

Although most consumers are rarely without their smartphone, they often carry at least one or more other items. For example, many users carry rechargeable battery packs for charging their devices on the go, and/or wireless earbuds, for listening to their device wherever they are. Others carry unrelated items such as e-cigarette/vaping devices or medical devices such as glucose testing devices, for example.

The present invention, directed to a protective case with removable functional modules differs from the conventional art in a number of aspects. Specifically, the present invention aims to increase the functionality of cases to perform or communicate with additional items used by consumers in their everyday lives. The manner by which will become more apparent in the description which follows, particularly when read in conjunction with the accompanying drawings.

SUMMARY OF THE INVENTION

The present invention is directed to a protective case with removable functional modules. One embodiment of the present invention can include a front housing for engaging the front surface of a portable electronic device, and a main body having a front surface for receiving the portable electronic device and the front housing. When engaged to the portable electronic device the main body and the front housing form a protective shell for protecting the portable electronic device from damage by impacts with foreign objects.

In one embodiment, a plurality of metallic strips is positioned along the main body. Additionally, a communication panel and a system controller are positioned along the back surface of the main body at a location that overlaps the metallic strips. The communication panel can include a plurality of communication terminals and alignment holes for receiving and engaging at least one removable module.

In one embodiment, a removable module is secured onto the main body. The module can include a plurality of magnetic elements for engaging the metallic strips, a plurality of alignment tabs for engaging the alignment holes, and a plurality of communication terminals for engaging the communication terminals on the communication panel. The module can also include a functional component comprising a battery pack for providing power to each of the portable electronic device and the system controller.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
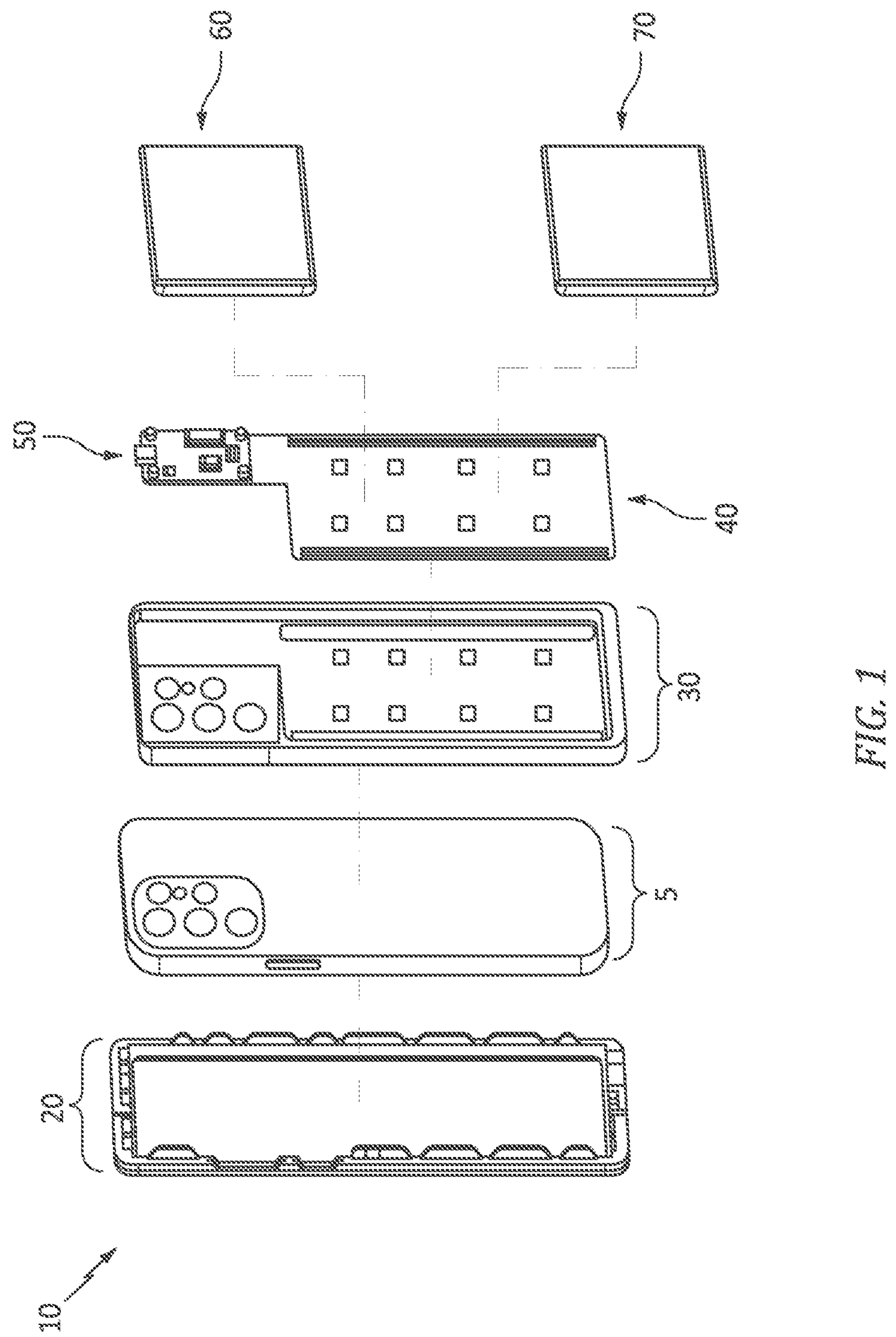
FIG. 1 is an exploded parts view of a protective case with removable functional modules that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "module" means one or more identified physical components which are linked together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles, clamps, sockets, clips, carabiners, and compression fittings, for example. Each illustrated connector and complementary connector can be permanently secured to the illustrated portion of the device via a permanent sealer such as glue, or welds, for example.

As described herein, the term "resilient memory" is defined as the ability of a component to maintain a particular shape and to attempt to return to the particular shape after being bent, folded, twisted or otherwise manipulated.

FIGS. 1-7 illustrate one embodiment of a protective case 10 with removable functional modules that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 3C.

As shown in the exploded parts view of FIG. 1, the device 10 can include, essentially, a front housing 20, a main body 30, a module communication panel 40, a system controller 50, and any number of attachment modules 60-70.

The front housing 20 and the main body 30 of the device 10 form a protective case having a shape and size that is complementary to the shape and size of a portable electronic device 5 such as the smartphone illustrated at FIG. 1. Of course, the inventive device is not limited to being used with a smartphone, as the case can be sized to engage, enclose and/or protect any type of portable electronic device such as different types of smartphones, tablet computers and other such devices.

Figure 2:
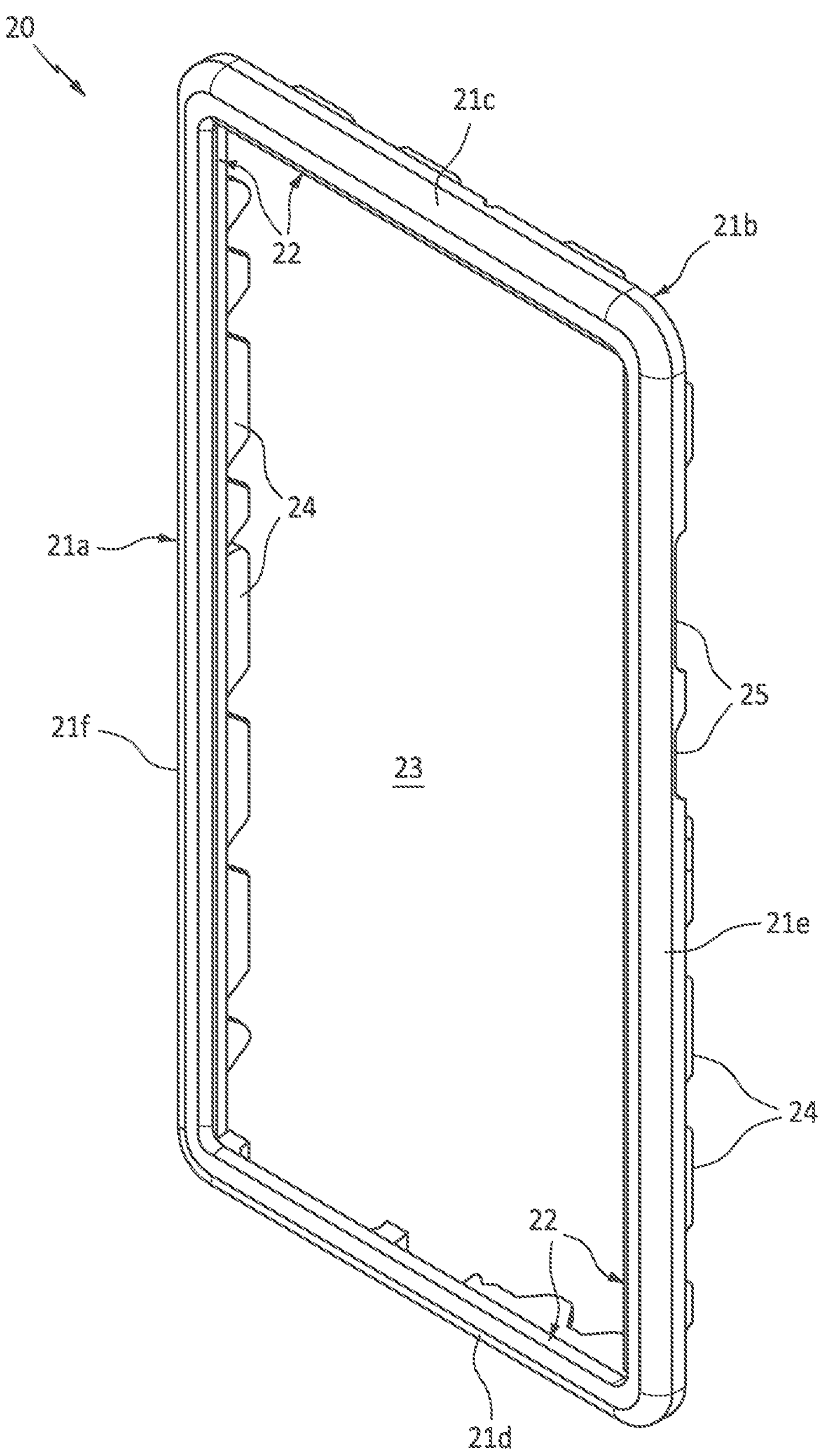
FIG. 2 is a perspective view of the front housing of the protective case device in accordance with one embodiment of the invention.

FIG. 2 illustrates one embodiment of the front housing 20 for use with the device 5. As shown, the housing can include a generally rectangular-shaped member having a front surface 21*a*, a back surface 21*b*, a top wall 21*c*, a bottom wall 21*d* and a pair of side walls 21*e* and 21*f*. A continuous lip 22 can be provided along an inside edge of each of the walls and can border a large central opening 23. In one embodiment, a plurality of protrusions 24 can extend from the back surface and can function to engage the inside edge of the raised walls 31*c*-31*f* of the main body described below.

As noted above, the front housing will include a shape and size that is complementary to the shape and size of a specific portable electronic device, such as the smartphone 5 illustrated at FIG. 1, for example. To this end, the front housing 20 may be constructed from any number of different impact absorbing and/or impact deflecting materials and may be rigid, malleable and/or resilient in nature. Several nonlimiting examples include, but are not limited to silicone, various plastics, and/or composite materials, for example.

In one embodiment, a plurality of openings or notches 25 can be provided along the walls of the housing at locations where items such as buttons, speakers or microphones on the device are located.

FIGS. 3A-3D illustrate one embodiment of the main body 30. As shown best at FIG. 3A, the main body can include a generally rectangular-shaped member having a front surface 31*a*, a back surface 31*b*, a top wall 31*c*, a bottom wall 31*d* and a pair of side walls 31*e* and 31*f*.

In one embodiment, a plurality of openings or notches 33 can be provided along the walls of the main body at locations complementary to notches 25 so as to ensure items such as buttons, speakers or microphones on the device 5 are accessible and not obstructed during use. Likewise, any number of lens openings 34 can be positioned along the main body. Each of the lens openings includes a shape and location that is complementary to the number, shape, and location of camera lenses 5*b* located on the back side of the electronic device 5.

As shown, the front surface 31*a* of the main body can be recessed relative to the walls 31*c*-31*f* and will include a shape and a size that is complementary to the shape and size of the portable electronic device 5 so as to permit the device to be positioned onto the front surface 31*a* with walls 31*c*-31*f* extending to a location equal to or above the screen 5*a*.

Figure 3A:
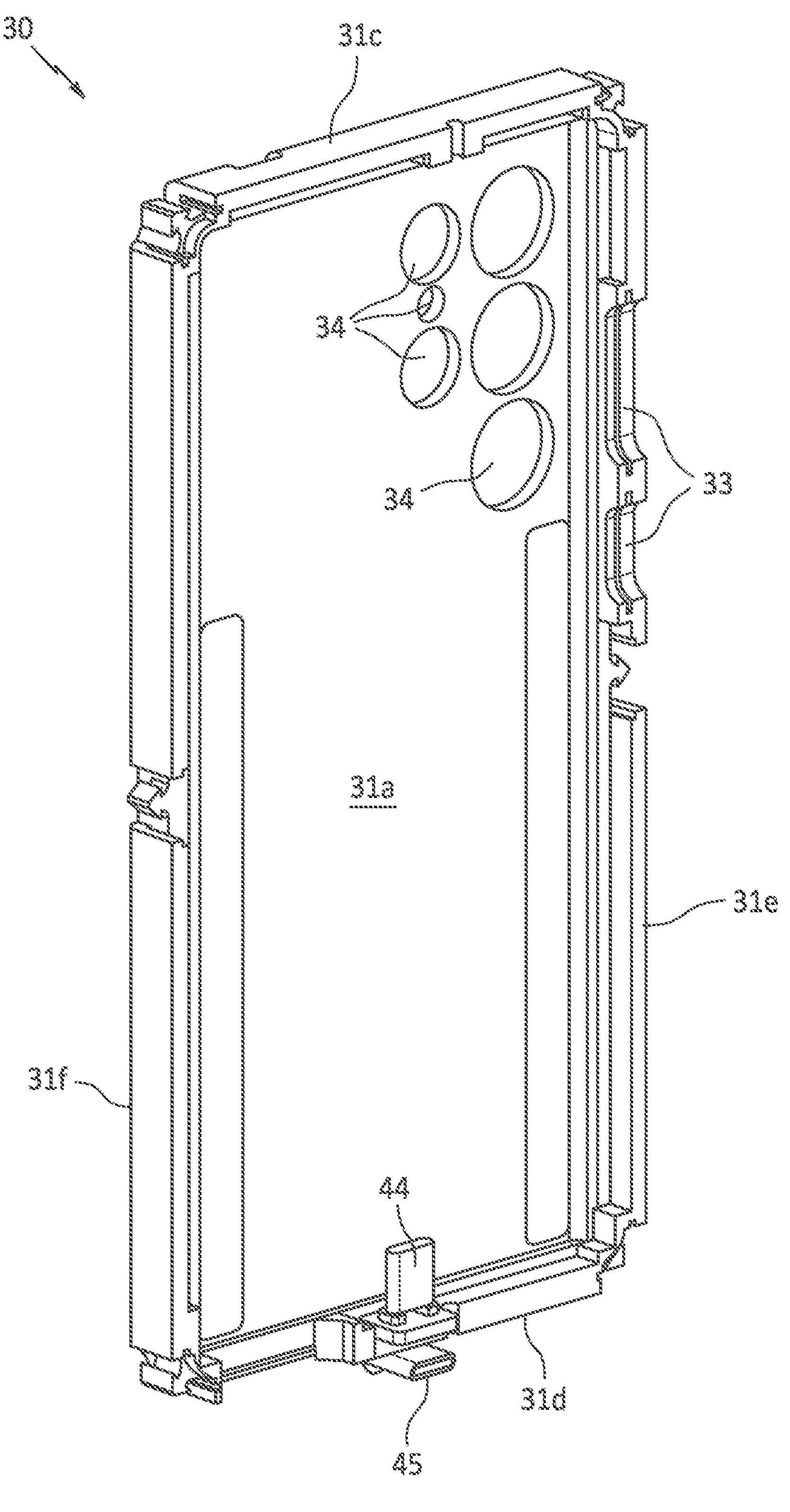
FIG. 3A is a perspective view of the front side of the main body of the protective case device in accordance with one embodiment of the invention.
Figure 3B:
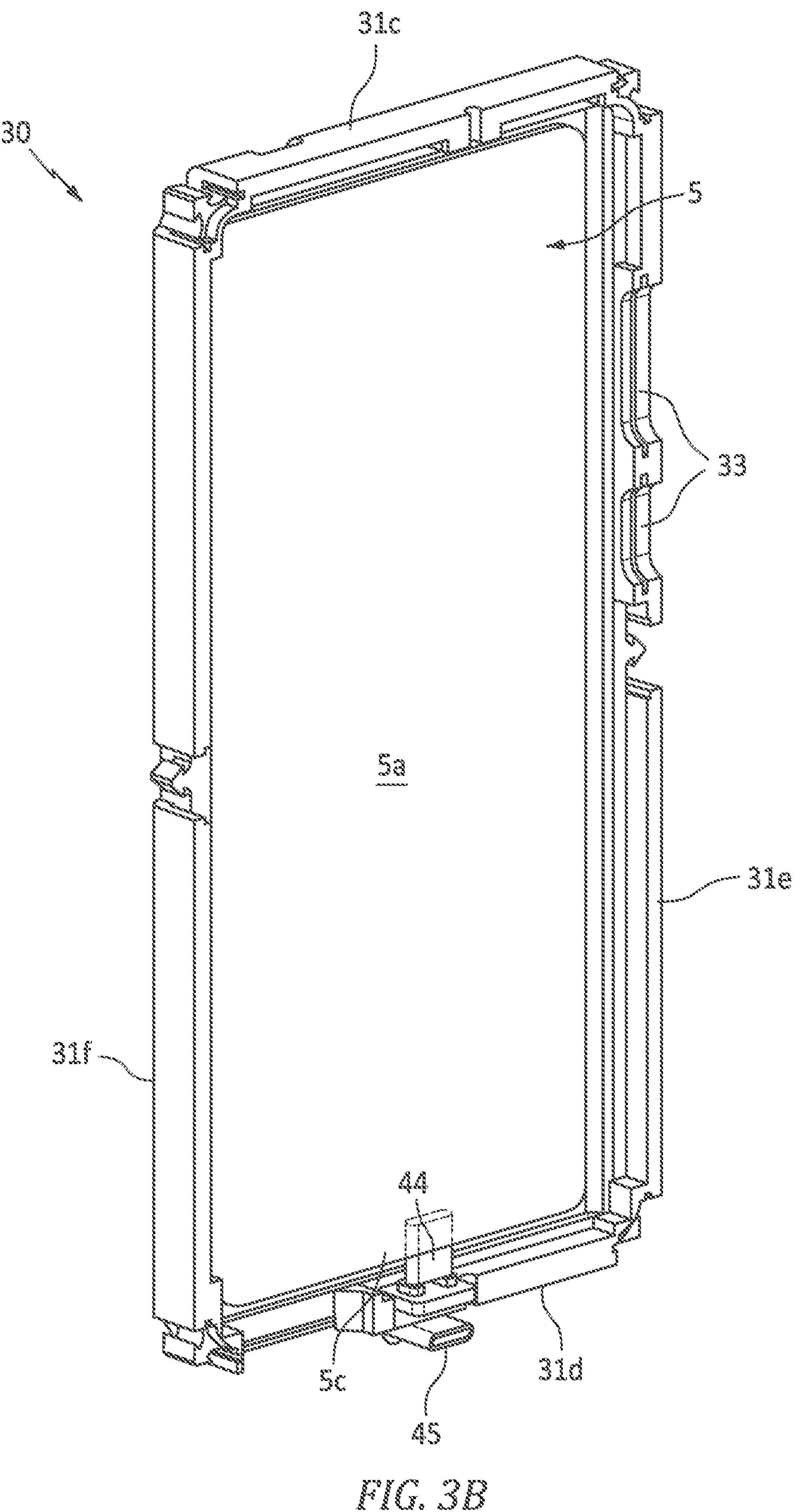
FIG. 3B is a perspective view of the main body of the protective case device in operation, in accordance with one embodiment of the invention.
Figure 3C:
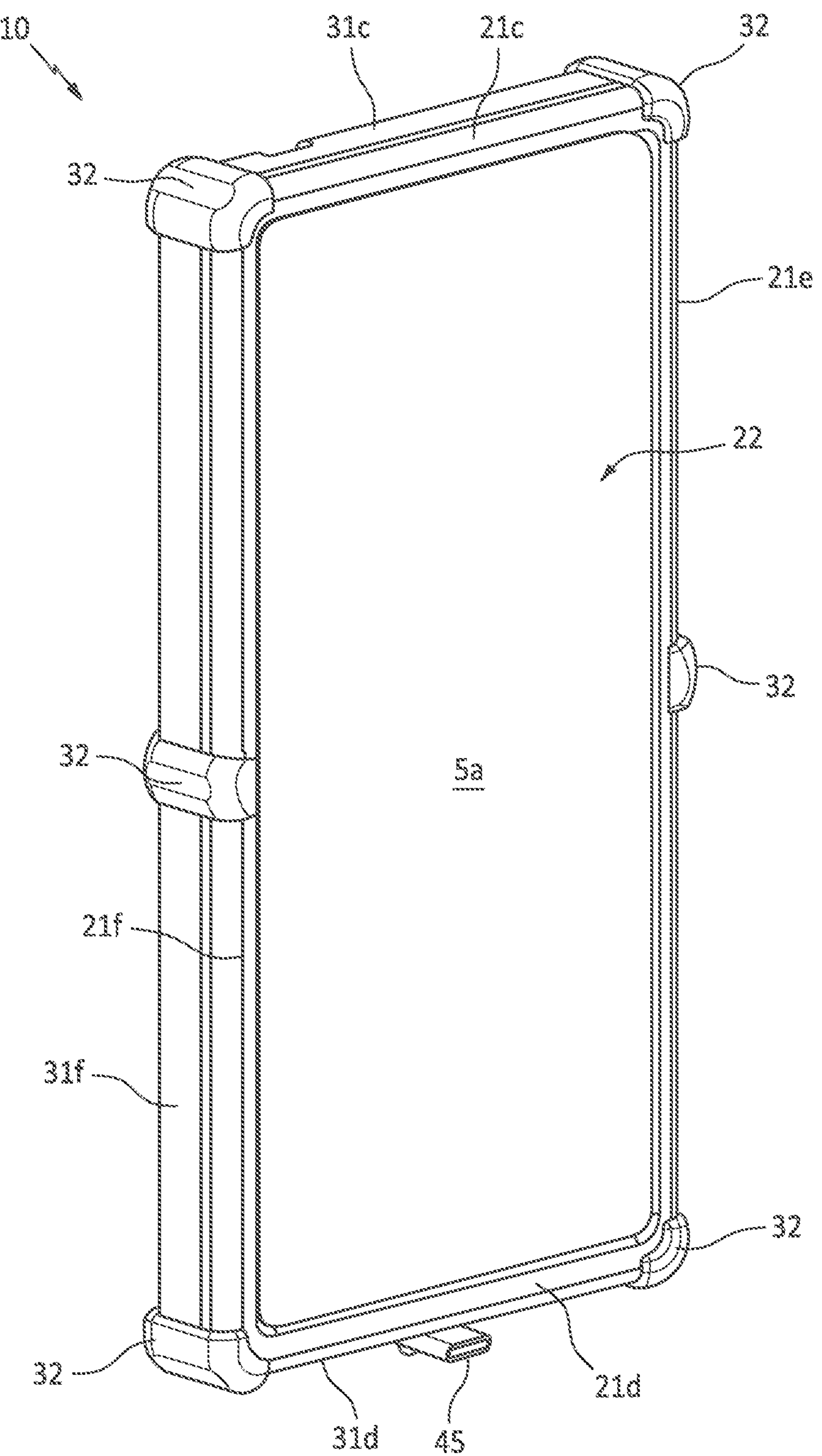
FIG. 3C is a perspective view of the protective case device in operation, in accordance with one embodiment of the invention.

As shown at FIG. 3C, when the front housing is positioned onto the device 5, the screen 5*a* of the device will be accessible via the opening 23, and the front surface 21*a* will extend above the front of the device to protect the smartphone from impacts with foreign objects.

In one embodiment, a plurality of removable bumpers 32 can be positioned along the outer walls of the main body. Each of the bumpers being constructed from an impact absorbing material such as rubber, for example, and can extend outward from the main body 30 and front housing 20 in both a lateral and vertical direction to provide additional shock absorption to the device 5 positioned within the case formed by the front housing and main body.

Figure 3D:
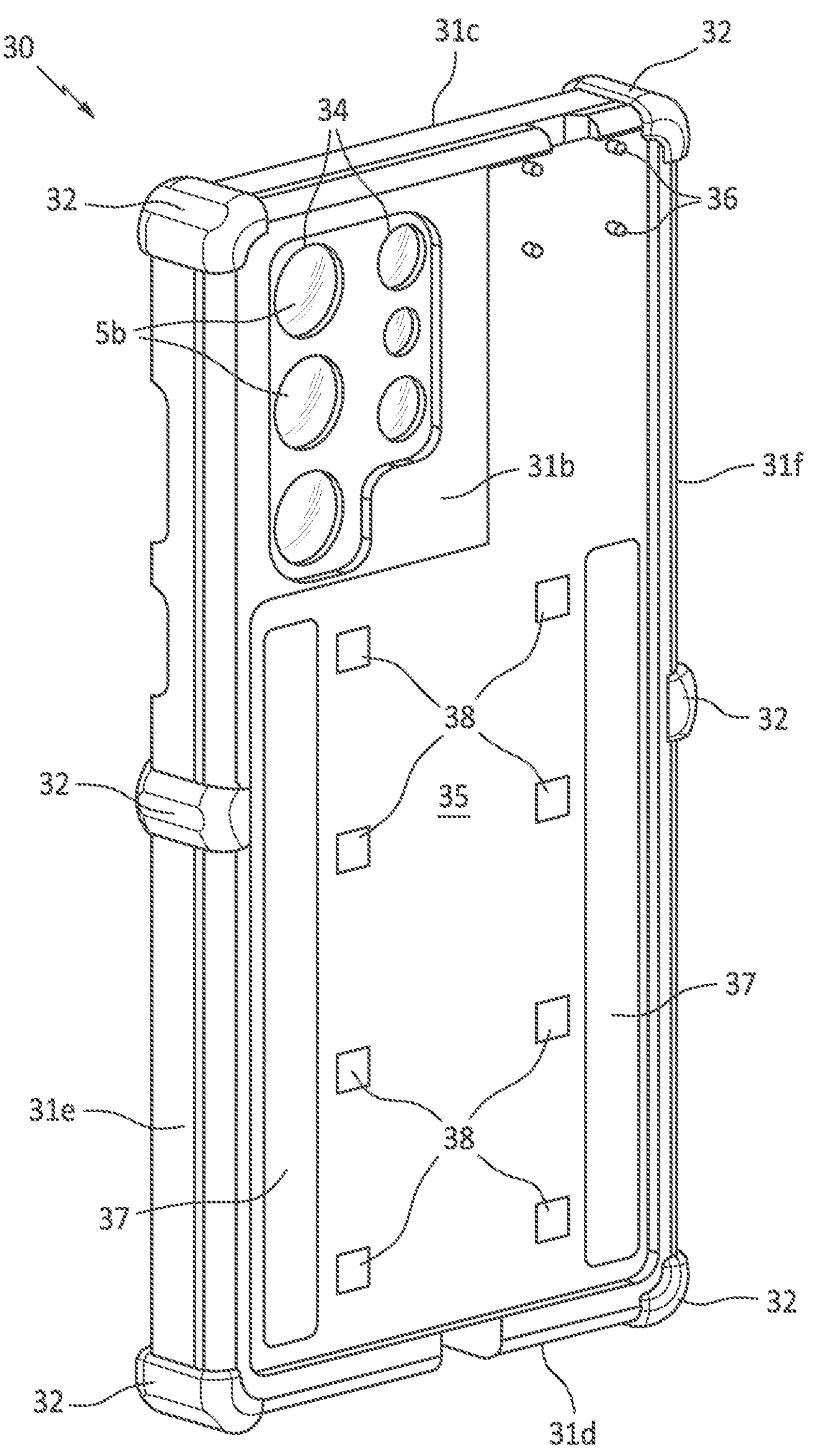
FIG. 3D is a perspective view of the back side of the main body of the protective case device in accordance with one embodiment of the invention.

As shown in FIG. 3D, the back surface 31*b* can include a large, recessed area 35 for receiving the below described communication panel and system controller. To this end, a plurality of connectors 36 such as the illustrated PCB mounting bosses can be provided anywhere along the back surface and the indentation. Additionally, two elongated metallic strips 37 can be positioned within the indentation 35, and a plurality of alignment divots 38 can be positioned in a grid formation between the metallic strips.

Figure 4:
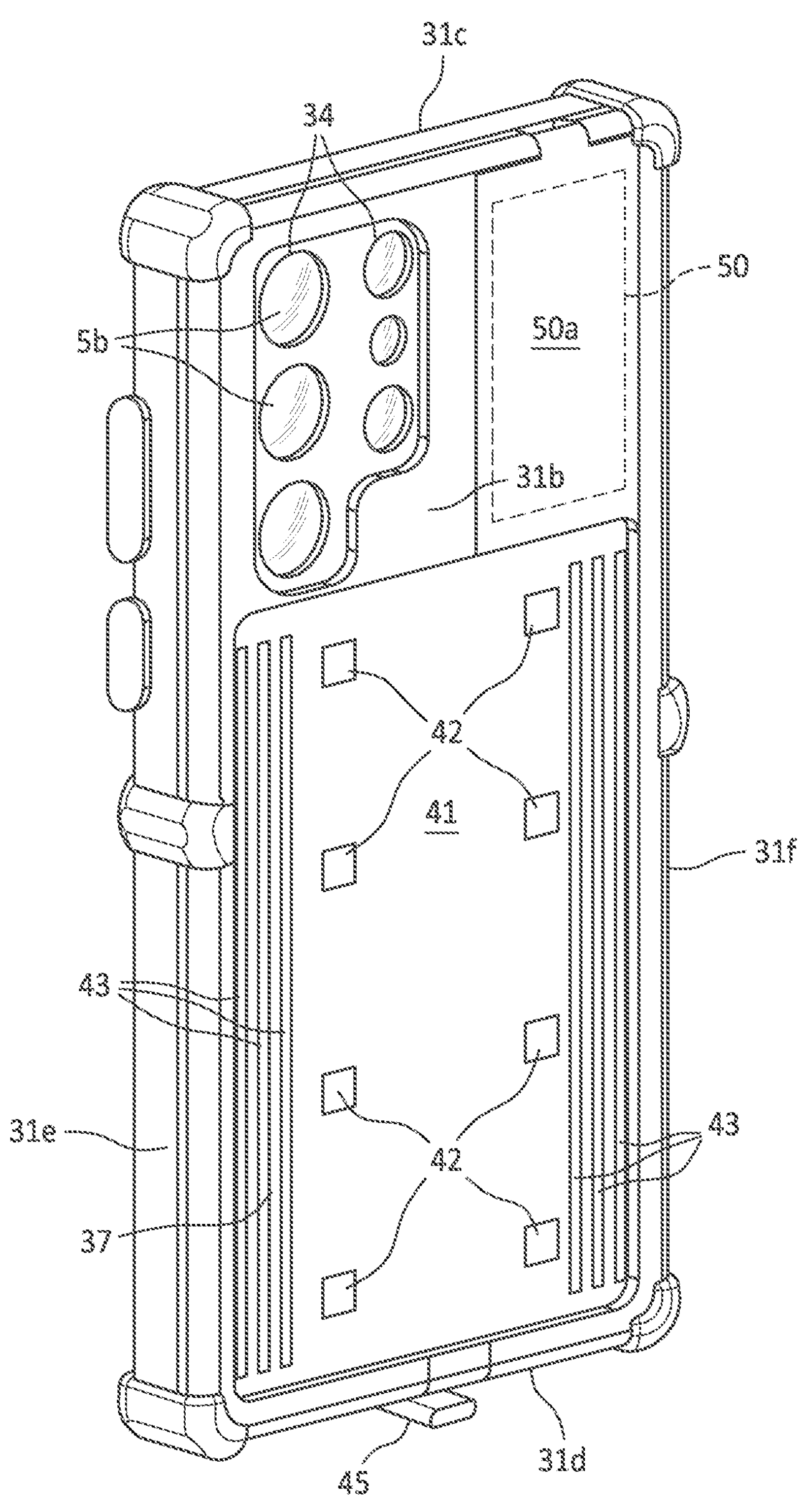
FIG. 4 is a perspective view of the communication panel of the protective case device in accordance with one embodiment of the invention.

As shown at FIG. 4, the module communication panel 41 can be positioned within the recessed area on the back surface 31*b* of the main body, so as to act as a receptacle for receiving and engaging a removable module. In the preferred embodiment, the panel can include an elongated hard or flexible printed circuit board, for example, that is permanently secured onto the main body via adhesives or other such materials. Of course, other embodiments are contemplated wherein the panel is removably secured onto the main body via connectors. In either instance, a plurality of alignment holes 42 can be positioned along the panel at complementary locations to the alignment divots 38 described above.

In one embodiment, a plurality of communication terminals 43 are positioned along the panel and are connected to the below described controller 50. Each of the terminals can function to selectively communicate with the communication terminals 63 of one or more of the removable modules described below at FIG. 6. As described herein, "communication terminals" can include any number of different components which can be connected to another component in order to send and receive power and/or electronic signals. Several nonlimiting examples include but are not limited to computer bus terminals integrated cable terminals, metallic signal rails, pogo pins and receptacles, and the like, for example.

In one embodiment, a pair of communication ports 44 and 45 can extend outward from the bottom end of the communication panel. Each of the ports can be connected to the controller 50 and can function to selectively receive and/or send power and electronic signals (e.g. operating instructions) to other devices. In the preferred embodiment, communication port 44 will be specific to the portable electronic device for which the system is designed to engage and will be positioned along the front surface of the main body 31*a* so as to be connected to the device when the device is secured onto the main body.

In the illustrated embodiment, the communication port 44 comprises a USB-C plug so as to engage and communicate with the communication port 5*c* of the smartphone 5 positioned within the case as shown at FIGS. 3A and 3B. However, both communication ports 44 and 45 can each include, comprise, or consist of any type of plug for engaging any type of electronic device. Several nonlimiting examples include, but are not limited to USB-A, USB-B, USB-C, Micro-USB, USB-3, USB, and lightening, among others, for example. In this regard, it is noted that both ports may be the same, or may be different from each other.

Figure 5:
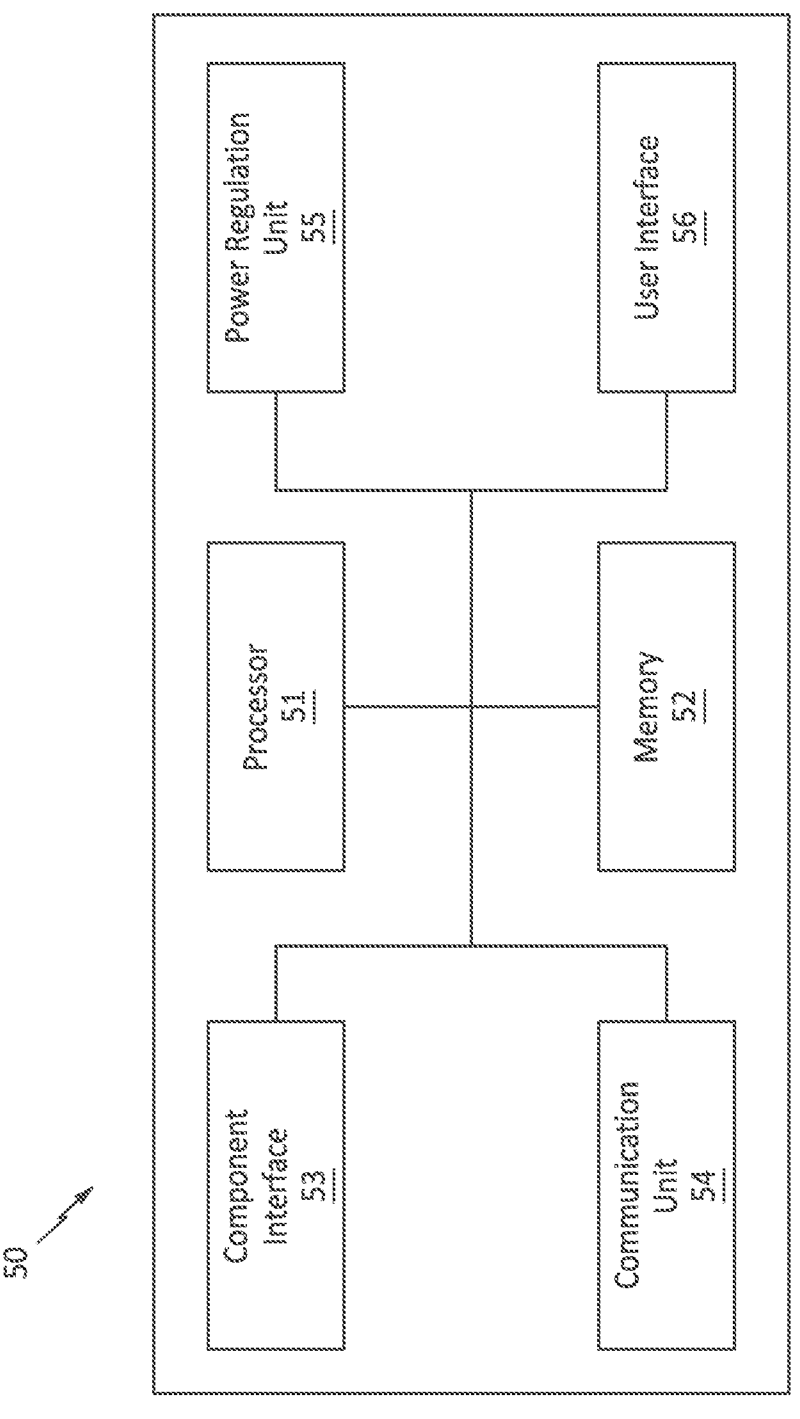
FIG. 5 a simplified block diagram of the system controller of the device, in accordance with one embodiment of the invention.

FIG. 5 is a simplistic block diagram illustrating one embodiment of the system controller 50. The controller can function to control the operation of the communication panel, and any removable modules connected to the panel, and can also be in selective communication with the portable electronic device 5 connected to the main body.

In one embodiment, the controller 50 can include a processing unit 51 that is conventionally connected to an internal memory 52, a component interface unit 53, a communication unit 54, a power management unit 55, and/or a user interface 56.

Although illustrated as separate elements, those of skill in the art will recognize that one or more system components 51-56 may include, comprise, or consist of one or more printed circuit boards (PCB) containing any number of integrated circuit or circuits for completing the activities described herein. The controller will preferably be housed within a protective, impact resistant and watertight enclosure 50*a*, such as plastic, for example, and will ideally be located adjacent to the communication panel 41 on the back side 31*b* of the main body. Of course, any number of other analog and/or digital components capable of performing the described functionality can be provided in place of, or in conjunction with the described elements, and the controller may be located at other locations.

The processing unit 51 can include one or more central processing units (CPU) or any other type of device, or multiple devices, capable of manipulating or processing information such as program code stored in the memory 52 in order to allow the device to perform the functionality described herein.

Memory 52 can act to store operating instructions in the form of program code for the processing unit 51 to execute. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a solid state micro hard drive, for example.

The component interface unit 53 can function to provide a communicative link between the processing unit 51 and each of the communication panel 41, the removable modules 60 and 70 and the portable electronic device 5. In this regard, the component interface unit can include or can be connected to any number of different components such as the above-described communication terminals 43 and communication ports 44-45, for example. Additionally, the component interface may also include any number of additional components such as one or more PIC microcontrollers, communication bus, connection cables, and the like for linking the various components.

The communication unit 54 can include any number of components capable of sending and/or receiving electronic signals with another device, either directly or over a network. In one embodiment, the communication unit can include a microcontroller that interprets different computer languages to permit the processor 51 to communicate with the above noted components via the component interface unit.

In one embodiment, the communication unit can also include a wireless transceiver such as a Bluetooth or Wi-Fi transceiver, for example, for communicating wirelessly with the smartphone 5 secured to the main body or other such devices. Of course, any number of other types of wireless transceivers are also contemplated.

The power regulation unit 55 can be connected to the component interface device, and more specifically, the communication port 44 so as to regulate the power supplied by the device 5 to the system controller 50. In this regard, the regulation unit 55 can include any number of circuits and/or individual components such as diodes, transistors, relays, and resistors, for example that can function to regulate the received power and to prevent an over voltage or over current situation between which could damage the controller. Likewise, the power regulation unit can manage the power being supplied to and/or from the removable modules to ensure each module receives or sends the correct power as requested by the module's onboard controller.

The user interface 36 can function to receive and/or send operating instructions with a user directly. To this end, the user interface can include any number of buttons or switches, for example, which can allow a user to control the device 10. Several nonlimiting examples of functions the user interface can perform include but are not limited to turning the device ON or OFF, pairing the controller 50 with a wireless device, selectively operating one or more of the removable modules, and more, for example. Of course, the user interface can also function as a software element which can be controlled on an application on the connected electronic device 5 that is plugged into the communication port 44 or wirelessly connected thereto, for example.

As described herein, the above noted device can function to receive and engage any number of removable modules, each capable of performing different functionality. One exemplary embodiment of a power bank module 60 is described below, however, any number of other types of modules capable of performing different functionality are also contemplated.

Figure 6:
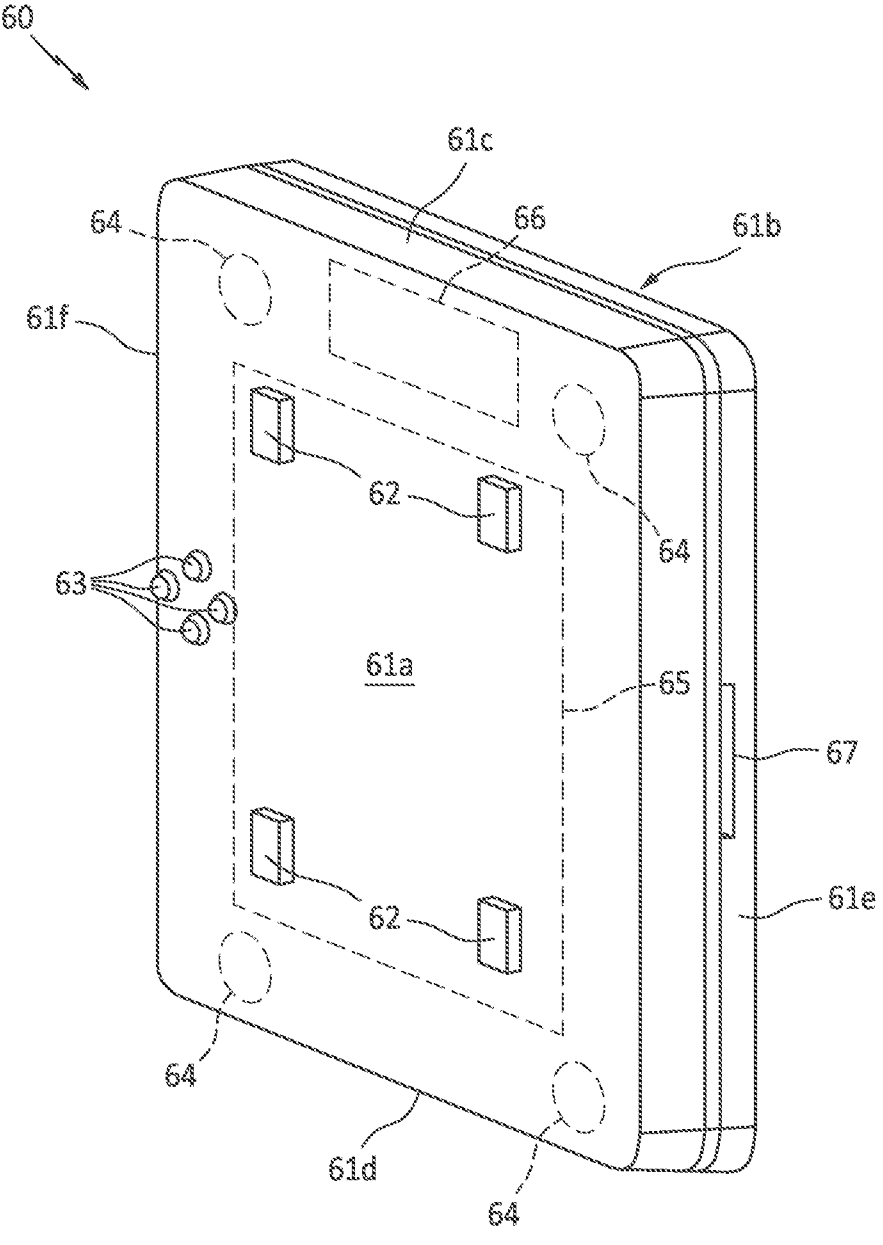
FIG. 6 is a perspective view of a removable module of the protective case device in accordance with one embodiment of the invention.

FIG. 6 illustrates one embodiment of a power bank module 60 that can be removably connected to the device 10. As shown, the module 60 can include a main body having a front surface 61*a*, a back surface 61*b*, a top wall 61*c*, a bottom wall 61*d* and a pair of side walls 61*e* and 61*f*. The main body can be constructed from any number of different materials such as various plastics, metals, or composites, for example, capable of securely housing the below described components.

In one embodiment, a plurality of alignment tabs 62 can extend outward from the front surface 61*a* of the module. The alignment tabs including a shape and location that is complementary to the shape and location of the above-described alignment holes 42 and alignment divots 38 so as to be positioned through the holes and rest within the divots when the module is connected to the back side of the main body of the case.

In one embodiment, a plurality of contact terminals 63 are positioned along the front surface 61*a* of the module 60. Each of the terminals 63 are positioned so as to engage one or more of the contact terminals 43 of the communication panel 41 when the module is connected to the back side of the main body of the case.

In one embodiment, a plurality of magnets 64 are positioned along or within the main body of the module. Each of the magnets are positioned in line with the pair of metallic strips 37 located on the indentation 35 on the back surface of the main body behind the communication panel 41. The plurality of magnets is designed to be magnetically attracted to the metallic strips and to work in conjunction with the alignment tabs to ensure the module is securely affixed to the back side of the main body of the case.

In one embodiment, the module can include a functional component in the form of a rechargeable battery pack 65 that has any number of individual power cells such as lithium-ion batteries, for example, positioned within the main body. The battery pack can be configured to output power at any number of different levels, such as 3.7 volts, for example, which can be fed though the contact terminals 63 to the communication panel 41, through the power management unit 55 and ultimately supplied to the device 5 connected to the communication port 44. Of course, other embodiments are contemplated wherein the power from the module 60 can be supplied to other devices via the secondary communication port 45.

In either instance, the power bank module 60 can include a module controller 66 that is located within the main body. The module controller can include any number of components such as one or more processors, memory devices, component interface units, communication units and power regulation units as described above, for allowing the module 60 to communicate with the system controller 50 in order to perform specific functions such as selectively discharge or charging power to or from the battery pack 65. In this regard, the operation of the module 60 can be controlled by the onboard controller 66 and/or the system controller 50 via a user operating the connected device 5 and/or the user interface 56.

In one embodiment, a dedicated charging port 67 such as a USB port, for example, can be provided along the module body for engaging a charging cable to charge the battery pack. Of course, any number of other types of charging ports are contemplated, and/or the module can include functionality for performing and receiving wireless charging.

Although described above with regard to a power bank module 60, this is but one possible module which can be used with the inventive device 10. As such, any number of other different modules 70 can be provided, each having a main body, alignment tabs, contact terminals, magnets and controller as described above for permitting each module to be removably connected to the case and to communicate with the onboard controller 50.

Additionally, each additional module can include one or more functional components for performing a specific task. Several nonlimiting embodiments of the functional components can include, but are not limited to vaping components, blood glucose detection and reporting components, vehicle smart key components, wireless earbud components and more, for example.

Figure 7:
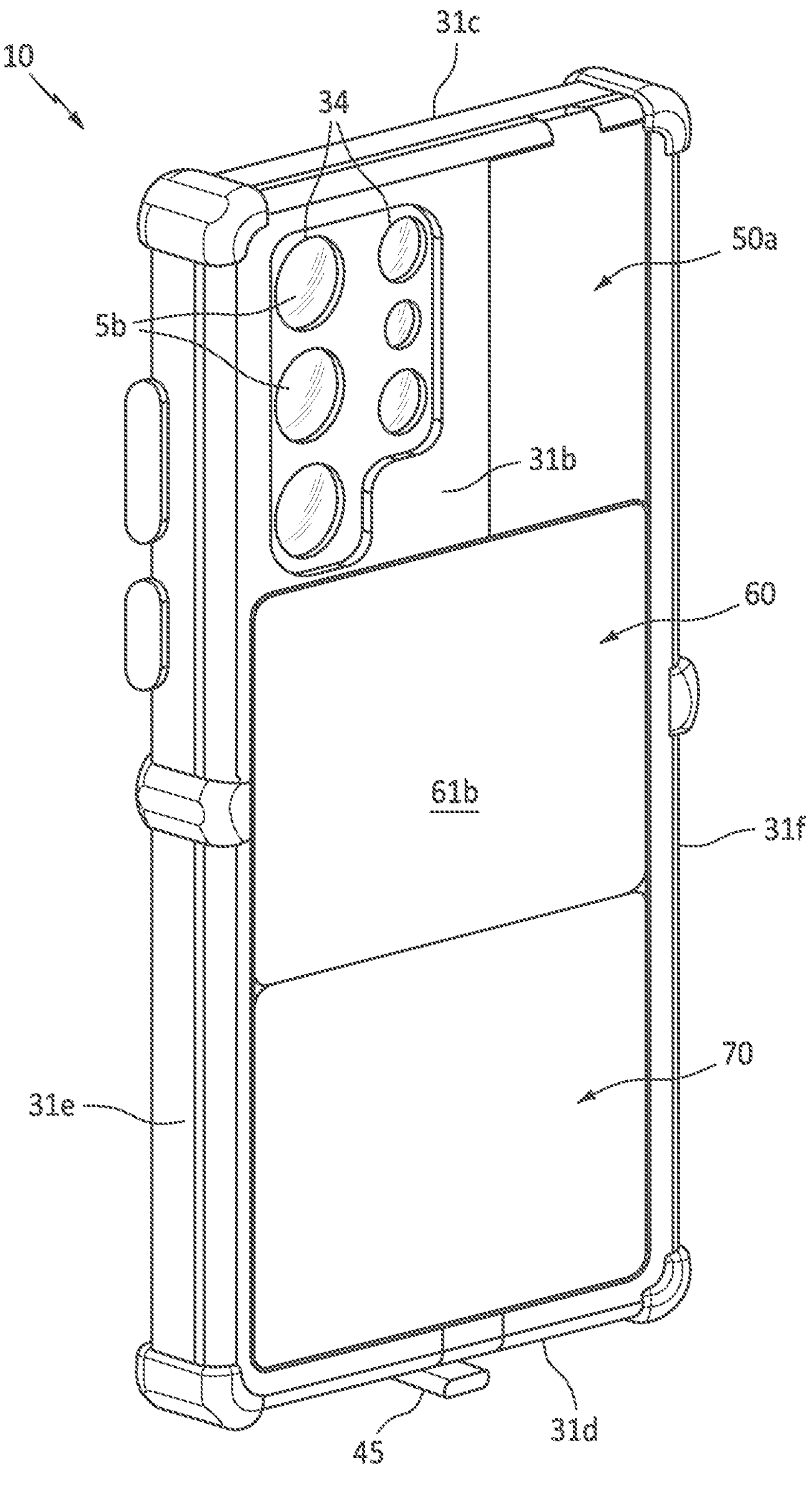
FIG. 7 is a back perspective view of the protective case device in operation, in accordance with one embodiment of the invention.

As shown best at FIG. 7, the device 10 will preferably include functionality for simultaneously housing and communicating with at least two different modules 60 and 70 at one time. Moreover, each module body will preferably include a thickness (e.g., distance between the front surface 61*a* and the back surface 61*b*) that is complementary to the depth of the above-described indentation 35 less the thickness of the communication panel 41. As such, when each module is secured to the back side of the main body of the case via the alignment tabs and magnets, the back surface of the module will be flush with the sidewalls 31*d*-31*f*.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A protective case, comprising:

a front housing having a front surface, a back surface, a plurality of walls and a central opening;

a main body having a front surface for directly receiving a portable electronic device, a back surface, and a plurality of walls that extend above the front surface; and a communication panel that is positioned along the back surface of the main body, said communication panel being configured to communicate with at least one removable module, wherein a front surface of the communication panel is configured to engage the back surface of the main body, and a back surface of the communication panel is configured to engage each of the at least one removable module, wherein the front housing and the main body include a shape and a size that is complementary to a shape and a size of a portable electronic device, and wherein the front housing and the main body are configured to removably engage each other and the portable electronic device to form a protective shell about the portable electronic device.

2. The device of claim 1, further comprising:

a system controller that is positioned along the main body and is in communication with the communication panel.

3. The device of claim 2, further comprising:

a communication port that extends from the communication panel.

4. The device of claim 3, wherein the communication port is configured to communicate with the portable electronic device to exchange at least one of power or electronic signals.

5. The device of claim 4, wherein the system controller includes functionality for communicating with the portable electronic device via the communication panel and the communication port.

6. The device of claim 5, wherein the system controller is configured to receive operating instructions from the portable electronic device.

7. The device of claim 2, wherein the system controller includes a wireless transceiver.

8. The device of claim 7, wherein the system controller includes functionality for communicating with the portable electronic device via the wireless transceiver.

9. The device of claim 8, wherein the system controller is configured to receive operating instructions from the portable electronic device.

10. The device of claim 1, wherein the at least one removable module comprises a power bank module that is removably connected to the communication panel.

11. The device of claim 1, wherein the back surface of the main body includes an outer periphery and a recessed area, wherein the communication panel is positioned within the recessed area, and wherein an outside surface of each of the at least one removable module are positioned flush with the outer periphery of the back surface of the main body when connected to the communication panel.

12. The device of claim 1, wherein the communication panel is removably positioned along the back surface of the main body.

13. The device of claim 1, wherein the at least one removable module, comprises:

a first module having a functional component that is configured to perform a first function; and a second module having a functional component that is configured to perform a second function, wherein the first function and the second function are different.

* * * * *